C. M. CHAPMAN.
METHOD OF AND APPARATUS FOR TESTING THE CONSISTENCY OF PLASTIC MATERIALS.
APPLICATION FILED FEB. 21, 1913.
1,233,843.
Patented July 17, 1917.
Fig. 1.
Fig. 2.
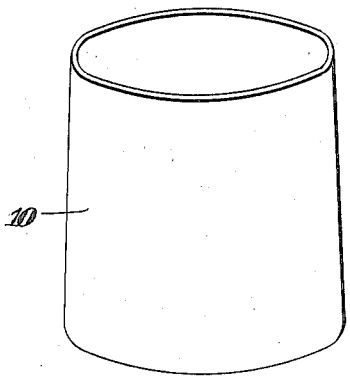
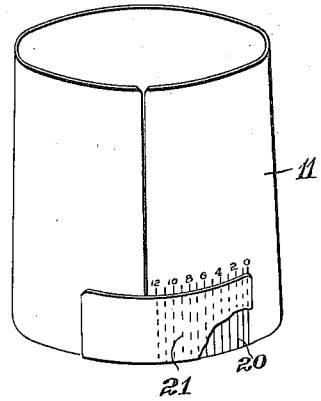
Fig. 3.
Fig. 4.
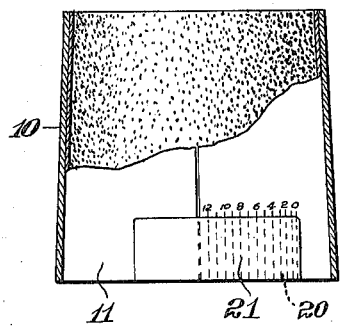
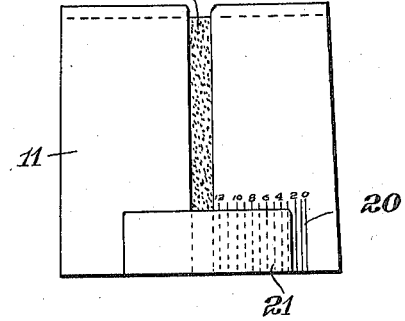
Fig. 5.
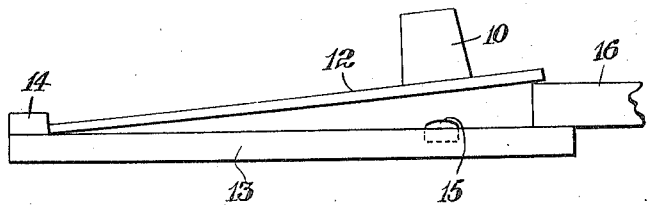
Attest:
J. O. Mitchell
L. R. Fox
Inventor:
Cloyd M. Chapman
by
Arthur L. Kent
his Atty

UNITED STATES PATENT OFFICE.

CLOYD M. CHAPMAN, OF NEW YORK, N. Y., ASSIGNOR TO WESTINGHOUSE, CHURCH, KERR & COMPANY, OF NEW YORK, N. Y., A CORPORATION OF NEW YORK.

METHOD OF AND APPARATUS FOR TESTING THE CONSISTENCY OF PLASTIC MATERIALS.

1,233,843. Specification of Letters Patent. Patented July 17, 1917.

Application filed February 21, 1913. Serial No. 749,777.

*To all whom it may concern:*

Be it known that I, CLOYD M. CHAPMAN, a citizen of the United States, residing at New York city, in the county of Queens and State of New York, have invented certain new and useful Improvements in Methods of and Apparatus for Testing the Consistency of Plastic Materials, fully described and represented in the following specification and the accompanying drawings, forming a part of the same.

This invention relates to the art of determining the consistency of plastic materials, and comprises a method for testing the consistency of such materials or mixtures wherein the material to be tested is first molded to a definite size and shape and is then allowed to stand wholly or partly without lateral support or released from restraint by the mold and the change which takes place in the unrestrained mass is then noted. The invention comprises, also, apparatus including a mold or form in which the material to be tested may be molded to the definite size and shape and which is adapted to be removed from the molded mass or otherwise to release the same, either absolutely or relatively, from lateral restraint; a support for the molded mass; and means for jarring the support. When the consistency of the material being tested is such that the proper consistency will be indicated by a more or less incipient change in the surface of the molded mass when unsupported or unrestrained, jarring of the support to induce a change in the mass may not be required, and the use of such jarring means as a part of the apparatus may then, of course, be unnecessary.

There has existed for a long time need of a method for the accurate determination of consistency of cement paste, lime paste, cement mortar, lime mortar, concrete, and other plastic materials or mixtures, but so far as I am aware, there has been up to the time of my invention no satisfactory method of determining such consistency. The Vicat needle is useful in testing neat cement paste, and the "ball test" has also furnished a simple and fairly accurate way of determining the consistency of this material. Neither the needle nor the "ball test", however, has been successfully applied to lime paste or to mortars, and neither can be used at all for concrete. Furthermore, the lack of any suitable method applicable generally to the testing of plastic materials has resulted in there being no accurate standards of consistency, with the possible exception of those hinging on the use of the Vicat needle, and consequently no way of accurately describing or specifying any particular consistency, the only terms in use for describing the consistency of concrete, for example, at the present time, being such general descriptive terms as "dry", "wet", etc. Obviously a practical accurate method of testing adaptable to the various materials for which there has been up to now no suitable method of testing, and, therefore, no definite standard of consistency, has been greatly needed. Such a method makes it possible to standardize consistency of the various materials to which it may be applied so that mixtures of specified character or consistency may be readily produced or previous mixtures duplicated.

The present invention has the object of providing a simple but practically accurate method of determining the consistency of concrete, mortars and other plastic mixtures or materials.

The accompanying drawings show a simple apparatus embodiment of the invention capable of being used in practising my process. In said drawings:—

Figure 1 shows in perspective a form for molding the plastic mixture.

Fig. 2 is a perspective view of a liner or membrane for use in connection with the form shown in Fig. 1.

Fig. 3 is a view showing the liner in place in the form with the form shown in section and the liner partly in elevation and partly in section, and showing the plastic material filling the mold.

Fig. 4 is a view in elevation showing the liner expanded by the filling of plastic material after the form has been removed.

Fig. 5 shows in elevation a simple form of apparatus for jarring the molded mass after it has been released from restraint.

The complete apparatus shown comprises a form 10, an expansible liner or inner mold 11 adapted to fit within and be supported or held against expansion by the form, a support 12, and means for jarring the support. The form 10 as shown is open at top and bottom, circular in cross-section and tapering slightly from its lower to its upper end. For some materials, such as, for example, a rather wet concrete mixture, quite accurate tests may be made with the use of only a simple mold such as the tapering form 10 and a support on which the molded material may rest, and in such case the support may be any body having a suitable surface which is best horizontal and non-absorbent.

In making a test of the consistency of rather wet material with a simple integral tapering mold such as the form 10 shown, the form is placed on the supporting surface and filled with the material to be tested and the top leveled off. The mold is then carefully lifted and the molded mass left unsupported or unrestrained to either support itself if dry enough to do so, or to settle down if wet enough to flow to any considerable extent. Supposing that the consistency desired be such that the material will just start to settle or sluff off when released from the form, then if such incipient settling or sluffing off of the material takes place, the consistency will be known to be that desired. If the mass stands erect and holds its shape without change, it will be known to be too dry, and if it sinks down and loses its shape this will show that it is too wet. By thus noting the change which takes place in the molded mass when released from the restraint of the mold, the consistency of any particular mixture may be very accurately determined, provided the mixture is wet enough so that a change appreciable to the eye will occur; and by changing the consistency and testing in this way a mixture of the specified or desired consistency may be readily obtained.

When the mixture to be tested is so dry that no appreciable flow takes place when the form is removed, then jarring may be resorted to in order to make the material under test settle or flow so as to produce an appreciable or measurable settlement; and if the material to be tested will not readily slip out of the form, then an expansible mold such as the expansible liner shown in Fig. 2 may be used. The form of liner which I find most suitable for use with the form shown in Fig. 1 is made of a sheet of thin flexible material of a size to fit around and completely cover the interior of the form with its vertical edges just meeting or more or less overlapped. The liner should be of material not affected by moisture, and there are advantages in making it of flexible elastic material set to normally retain the desired shape, or it might be normally of a size in cross-section somewhat less than that required to fit within the form 10, so that when the material to be tested has been filled into the mold with the liner fitting close against the form and the form then removed to release the molded mass from restraint, the liner will hold its shape closely hugging the molded mass under a yielding tension, the comparatively slight yielding resistance to expansion not being sufficient, however, to interfere in any objectionable way with the settling of the molded mass. The best material I have so far found for the purpose is a thin sheet of hard rubber. Other materials might, of course, be used, and I have found celluloid or suitable prepared paper to answer well for some mixtures. An expansible mold made of the form and structure of the inner mold or liner 11 or otherwise, if of material of sufficient strength to give the necessary rigidity to the mold, may obviously be used without a sustaining form such as the form 10, other suitable means being provided for holding the mold against expansion while the material to be tested is being molded therein and for releasing the mold to permit it to expand as the molded mass within it settles down.

When the expansible mold of the form shown is used as a liner with the form 10, the liner is placed inside the form before it is filled, and the complete mold thus provided is then placed on the supporting surface and filled as before with the material to be tested. The form is then removed leaving the liner free to be expanded circumferentially or opened out more or less by the settling of the molded material. If the material is quite wet, sufficient setting may take place without jarring to produce a substantial measurable opening of the liner. Otherwise, jarring should, as above stated, be resorted to in order in some cases to produce any appreciable settling and in others to produce sufficient settling to cause such a relative movement of the meeting or overlapping edges of the liner as will be sufficient for practical measurement.

The amount of jar imparted to the support must, of course, in order to be of any value in the test, be a definite predetermined amount. A shock or blow for producing such predetermined jar may be given by any suitable means. I secure good results by causing a blow to be delivered to the support directly beneath the molded mass of material being tested. In Fig. 5 I have shown a simple form of apparatus whereby a definite predetermined blow may be delivered to the support. In such apparatus the support 12, formed of a plate of non-absorbent material such as glass or metal, rests at one end on a bed plate or base 13 against a positioning rib 14. The other end of the plate 12 is, for jarring the molded mass of material resting thereon, lifted a definite height and allowed to drop. In order to prevent air cushioning and to secure the full force of the blow at a point on the bottom of the plate 12 over which the molded mass should rest, I provide a button or striking piece 15 of lead or other suitable material set into and projecting slightly above the upper face of the base 13. The dropping of the plate 12 from a definite height may be easily effected by inserting under the edge of the plate the end of a metal strip 16 or other suitable object of the desired height as shown in Fig. 5 and then quickly withdrawing the strip.

The jar or shock imparted to the plate 12 when it falls against the button 15 causes the molded material to settle more or less according to its consistency, thereby increasing its circumference. This increase in circumference causes a corresponding opening out of the liner so that the extent to which the molded mass settles will be indicated by the relative movement between the vertical edges of the liner. A definite consistency of the mixture being tested will thus always cause a definite relative movement between the edges of the liner, too dry a mixture causing a lesser movement, and too wet a mixture causing a greater movement.

As the spreading or opening out of the liner indicates the consistency of the mixture being tested, it is desirable that means be provided for readily measuring such spreading of the liner. This may be accomplished by providing the liner with a suitable scale with which an overlapping portion of the liner coöperates to indicate the extent of the opening movement. The scale should best be arranged so as to indicate the amount of movement in a horizontal plane near the bottom of the molded mass being tested. In the drawings I have shown the liner made so that its vertical edges will just meet when it is in position in the form 10, and with one end near its bottom edge marked with a scale 20 and with the other end provided with a measuring strip 21 extending to coöperate with the scale to indicate the amount of spreading of the liner when its meeting edges are forced apart by the settling of the molded mass within it. Fig. 3 shows the mold filled with material $a$ to be tested, and Fig. 4 indicates the opening out of the liner after the form 10 has been removed and after the molded material $a$ has settled down under the influence of a jar or otherwise and caused the liner to be opened out to an extent corresponding to the settling of the material and which is then indicated by the strip 21 and scale 20. The spreading of the liner or expansible mold is not necessarily the same at the top as at the bottom even when the mold is equally free to spread at the top and bottom. Usually the spreading will be greatest at the bottom and is best measured at or near the bottom.

In order that uniform results may be secured and that definite standards of consistency may be established for various materials, it is necessary, of course, that certain fixed rules or standards be observed for securing uniform conditions in testing materials by my method, as for example, the mixture should be made in a certain specified way, and should be filled into the mold in a specified manner, and with materials which set rapidly, such as cement, the mixture should be filled into the mold within a specified time after mixing, and the molded mass should be released from restraint by the mold and jarred if jarring is employed within a specified time.

It will be observed that with the apparatus shown when the liner is placed within the form 10, the liner constitutes an inner mold, or mold proper, and the form serves as a means for supporting the same or holding it against expansion. The size and shape of the mold or form used should be governed to some extent by the character and consistency of the material to be tested, a relatively low form being desirable for soft, wet mixtures, and a relatively taller form for drier mixtures. A mixture such as concrete, containing relatively large pieces, calls for a larger form than a mixture of fine material, and I find it desirable in testing concrete to use a form whose smallest dimension is at least twice the greatest dimension of the largest pieces in the mixture. When the material is molded directly against the inner surface of the form shown and released completely from restraint by the mold by lifting the form away from the molded mass, and also when the expansible inner mold or liner shown is used and the molded mass is released substantially or relatively from lateral restraint by lifting away the form 10, the molded mass is so released from restraint or from lateral support on all sides or for its whole circumference. Obviously, however, it may not be necessary in all cases that the molded mass be released from restraint on all sides in order that there may be a measurable settlement or other noticeable change therein.

What is claimed is:

1. The method of testing the consistency of plastic material which consists in molding the material to a definite size and shape, releasing the molded mass from restraint by the mold, and then subjecting the molded mass to a definite jarring and noting the change which takes place therein.

2. The method of testing the consistency of plastic material which consists in molding the material to a definite size and shape, releasing the molded mass from restraint by the mold, and then subjecting the molded mass to a definite jarring, and measuring the settling thereof.

3. The method of testing the consistency of plastic material which consists in molding the material to a definite size and shape, releasing the molded mass from restraint by the mold, and then subjecting the molded mass to a definite jarring, and measuring the increase which takes place in a lower horizontal dimension thereof.

4. The method of testing the consistency of plastic material which consists in molding the material to a definite shape circular in horizontal cross-section and of definite size, allowing the molded mass to stand with its sides unsupported, and then subjecting the molded mass to a definite jarring, and measuring the increase in circumference thereof at or near its base.

5. The method of testing the consistency of plastic material which consists in filling the material into a mold of definite size and shape, releasing the molded mass from restraint by the mold, and then subjecting the molded mass to a definite jarring, and thereafter measuring the change which takes place in a given dimension thereof.

6. The method of testing the consistency of plastic material which consists in filling the material into a mold of definite shape circular in horizontal cross-section and of definite size, releasing the molded mass from restraint by the mold, and then subjecting the molded mass to a definite jarring, and thereafter measuring the increase in circumference thereof at or near its base.

7. Apparatus for testing the consistency of plastic materials, comprising an expansible mold adapted to have the material to be tested molded to a definite size and shape therein, and means for holding the mold against expansion while the material is being molded and for releasing the mold to permit it to expand, said mold being made of non-stretchable material and adapted to expand when released with and according to change in form of the molded mass, whereby the amount of expansion of the mold will show the relative amount of change in form of the molded mass.

8. Apparatus for testing consistency of plastic materials, comprising an expansible mold adapted to have the material to be tested molded to a definite shape therein, and means for holding the mold against expansion while the material is being molded and for releasing the mold to permit it to expand with change in form of the molded mass, and indicating means for indicating the amount of expansion of the mold.

9. Apparatus for testing consistency of plastic materials, comprising a mold open at both ends and expansible from its molding position to increase its cross-sectional size, but offering a slight yielding resistance against expansion, and means for holding the mold against expansion while the material is being molded therein and for releasing the mold to permit it to expand against such yielding resistance with change in form of the molded mass.

10. Apparatus for testing consistency of plastic materials, comprising a mold including a form open at both ends and a liner comprising a split sleeve of thin flexible and non-stretchable sheet material of a size to fit within the form and cover the interior surface thereof, the liner forming an expansible mold which when released by removal of the form may expand with change in form of plastic material which has been filled into the mold.

11. Apparatus for testing consistency of plastic materials, comprising a mold including a form and a liner of thin flexible material of a size to fit within the form, the liner forming an expansible mold which when released by removal of the form may expand with change in the form of plastic material which has been filled into the mold and being provided with means for indicating the amount of such expansion.

12. Apparatus for testing consistency of plastic materials, comprising a sheet of thin flexible, non-stretchable and elastic material shaped to form an expansible open-ended mold and offering a slight resistance to expansion from its molding position, and means for holding the mold against expansion while the plastic material is being molded therein, said means being removable for releasing the mold to permit it to expand with change in form of the molded mass.

13. Apparatus for testing consistency of plastic materials, comprising means for molding the material to a definite size and shape, a supporting plate on which the molded material may rest, a base having means for positioning one end of the plate, means for releasing the other end of the plate from a position at a definite distance from the base, and a striking piece positioned on the base and against which the supporting plate falls.

14. Apparatus for testing consistency of plastic materials, comprising an expansible mold, means for holding the mold against expansion while the material to be tested is being molded therein and for releasing the mold to permit it to expand with change in form of the molded mass, a support for the molded mass, and means for definitely jarring the support.

In testimony whereof I have hereunto set my hand in the presence of two subscribing witnesses.

CLOYD M. CHAPMAN.

Witnesses:
W. L. MURRAY,
A. L. KENT.